United States Patent
Nakahama et al.

[11] Patent Number: 5,912,303
[45] Date of Patent: Jun. 15, 1999

[54] ETHYLENE/α-OLEFIN/NONCONJUGATED POLYENE TERPOLYMER RUBBER COMPOSITION AND VULCANIZED RUBBER OBTAINED THEREFROM

[75] Inventors: Hidenari Nakahama; Masaaki Kawasaki; Tetsuo Tojo, all of Ichihara; Totshiyuki Tsutsui, Kuga-gun; Toshihiro Sagane, Tokyo, all of Japan

[73] Assignee: Mitsui Chemicals, Inc., Tokyo, Japan

[21] Appl. No.: 08/652,901

[22] Filed: May 23, 1996

[30] Foreign Application Priority Data

| May 24, 1995 | [JP] | Japan | 7-125433 |
| May 24, 1995 | [JP] | Japan | 7-125434 |
| May 24, 1995 | [JP] | Japan | 7-125436 |

[51] Int. Cl.$^6$ .............. C08L 9/00; C08L 47/00
[52] U.S. Cl. .............................. 525/237; 526/336
[58] Field of Search .............. 525/237; 526/336

[56] References Cited

U.S. PATENT DOCUMENTS

| 2,418,912 | 4/1947 | Sparks et al. | 526/336 X |
| 3,179,718 | 4/1965 | Wei et al. | 525/233 |
| 3,190,859 | 6/1965 | Wei et al. | 525/233 |
| 3,480,599 | 11/1969 | Park et al. | 526/336 X |
| 3,887,531 | 6/1975 | Schneider et al. | 526/336 X |
| 3,900,452 | 8/1975 | Valvassori et al. | 526/336 X |
| 4,405,756 | 9/1983 | Oyama et al. | 525/237 |
| 4,409,365 | 10/1983 | Coran et al. | 525/78 |
| 4,973,627 | 11/1990 | Mitchell | 525/211 |
| 5,292,845 | 3/1994 | Kawasaki et al. | 526/336 |
| 5,349,020 | 9/1994 | Okada et al. | 525/237 |

OTHER PUBLICATIONS

Japanese Abstract JP–A–07 053 802, Derwent WPI, Feb. 1995.

Japanese Abstract JP–A–06 179 722, Derwent WPI, Jun. 1994.

Japanese Abstract JP–A–56 098 249, Derwent WPI, Aug. 1981.

Mitchell, J.M., "Nitrile—EPDM Polymer Blends—Fundamental . . . ", Rubber Chem. and Tech., 50, pp. 430–431 (1977).

Hazelton, et al., "Compounding EPDM For Dynamics . . . ", Rubber Chem. and Tech., 44, pp. 1043–1056 (1971).

Whittington, W.H., "Practical blends of nitrile and EPDM . . . ", Rubber Industry, 9, pp. 151–156 (1975).

Oda, et al., Journal Of The Society Of Rubber Industry, Japan, vol. 51, pp. 685–692 (1978).

*Primary Examiner*—David W. Wu
*Attorney, Agent, or Firm*—Sherman and Shalloway

[57] ABSTRACT

A terpolymer rubber prepared from ethylene, α-olefin having 3 to 20 carbon atoms and branched chain polyene of the formula

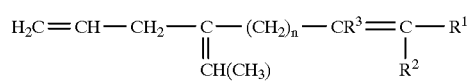

wherein $R^1$ represents $C_1$–$C_5$ alkyl, and $R^2$ and $R^3$ represent hydrogen atom or $C_1$–$C_5$ alkyl, such as, for example, 6,7-dimethyl-4-ethylidene-1,6-octadiene, 6,7-dimethyl-4-ethylidene-1,6-nonadiene, and 9-methyl-4-ethylidene-1,8-decadiene; when added to a rubber (diene rubber, nitrile rubber or random copolymer rubber from ethylene, $C_3$–$C_{20}$ α-olefin, and optionally a nonconjugated diene) provides curable rubber compositions having rapid vulcanization rates, for example, as lows as about 7 to 10 seconds. The diene rubber compositions also have excellent resistances to weather, ozone and heat aging while maintaining excellent mechanical strength characteristics. The nitrile rubber compositions also have excellent oil resistance.

12 Claims, No Drawings

ETHYLENE/α-OLEFIN/NONCONJUGATED POLYENE TERPOLYMER RUBBER COMPOSITION AND VULCANIZED RUBBER OBTAINED THEREFROM

FIELD OF THE INVENTION

The present invention relates to an ethylene/α-olefin/nonconjugated polyene terpolymer rubber composition and a vulcanized rubber obtained therefrom which is excellent in, for example, resistances to weather, ozone and heat aging.

BACKGROUND OF THE INVENTION

The ethylene/propylene/diene terpolymer rubbers (such as EPDM and EPT) have no double bond in the principal chain of its molecular structure, so that they are highly resistant to weather, ozone and heat aging although the oil resistance thereof is poor. Thus, because of their excellent properties, they are often employed in automobile parts, at locations to which static force applies, such as a weather stripping, a door glass run channel and a radiator hose.

On the other hand, the nitrile rubber (NBR) has excellent strength characteristics and oil resistance although the heat resistance and low temperature flexibility thereof are poor, so that it is often employed in a hose and a packing arranged around an engine.

Most parts requiring mechanical strength against dynamic fatigue, such as a tire and a rubber vibration insulator, are composed of a diene rubber, for example, NR, SBR or BR or a blend thereof.

There are a number of automobile parts required to simultaneously have the excellent properties of both polymers of EPDM and NBR, which would be realized by improving the oil resistance of EPDM or improving the heat resistance and low temperature flexibility of NBR.

For obtaining a homogeneous compound by blending EPDM and NBR, first, it is needed to take measures for coping with the difference in polarity between these polymers.

Such measures are being studied from the angle of milling procedure. For example, the attempt to render the compound dispersibility uniform by adding a large amount of carbon black to both polymers of EPDM and NBR to thereby prepare a carbon master batch (CMB) is reported in J. M. Mitchl: Rubber Chem. Technol., 50, 430 (1977).

Further, the attempt to uniformly disperse the vulcanization accelerator by the use of $Pb_3O_4$ is reported in W. H. Whttington; Rubber Ind., 9, 151 (1975).

Secondly, it is needed to take measures for improving the covulcanizability of diene polymers NBR and EPDM.

Such measures include the attempt to improve the above covulcanizability by increasing the vulcanization velocity of EPDM which is generally very low. In this attempt, EPDM is reacted with sulfur in advance to thereby increase the vulcanization velocity of EPDM. This is well known as the pendant sulfur method.

Blend compounds of NBR and EPDM having been prepared by the partial or full utilization of such measures are now commercially available.

Although the problem of polymer polarity can be alleviated to some extent by the above measures, however, the vulcanization velocity of EPDM is conspicuously lower than that of NBR, so that the covulcanizability of EPDM/NBR blend compounds is not always satisfactory.

The attempt to increase the vulcanization velocity of EPDM is described in, for example, Japanese Patent Laid-open Publication No. 6(1994)-128427. In this attempt, ethylene, propylene and 7-methyl-1,6-octadiene as a nonconjugated polyene are terpolymerized. The resultant EPDM exhibits a greatly increased vulcanization velocity, so that the covulcanizability with NBR is improved. That the covulcanizability of EPDM and NBR is improved by increasing the vulcanization velocity of EPDM is described in the publication.

However, it still cannot be stated that the covulcanizability of EPDM and NBR is satisfactorily high, and there is a demand for the development of a polymer such as a novel diene-bearing EPDM capable of increasing the vulcanization velocity to thereby further improve the covulcanizability with nitrile rubber (NBR).

Therefore, there is a demand for the developments of such a polymer, an ethylene/α-olefin/nonconjugated polyene terpolymer rubber composition composed of the above polymer and nitrile rubber (NBR), which composition enables providing a vulcanized rubber being excellent in not only strength characteristics and oil resistance but also resistances to weather, ozone and heat aging, and a vulcanized rubber obtained from the ethylene/α-olefin/nonconjugated polyene terpolymer rubber composition.

On the other hand, the improvement of the heat aging and weather resistances of automobile parts is demanded in accordance with the recent enhancement of the quality of the parts.

Although EPDM has excellent resistances to weather, ozone and heat aging, the use of EPDM alone in a tire or a rubber vibration insulator is not suitable because of its poor dynamic fatigue resistance.

Thus, blends of EPDM and a diene rubber have extensively been investigated for attaining the full exertion of the advantages of the materials. However, any EPDM/diene rubber blend being excellent in covulcanizability has not been obtained to thereby render its practical use unattainable.

With respect to the above investigations, the developed technologies on EPDM/diene rubber blends are summarized by Messrs. Yasuhiro Oda and Masashi Aoshima in Journal of the Society of Rubber Industry, Japan, 51, 685 (1978), which include (1) polysulfide vulcanization, (2) peroxide vulcanization, (3) application of preliminarily vulcanized EPDM, (4) application of EPDM of high iodine value, (5) application of halogenated EPDM and (6) use of an accelerator having a long-chain alkyl group.

Further, the above literature describes that EPDM having an intrinsic viscosity of at least 3.0 dl/g as measured in xylene at 70° C., a propylene content of up to 35% and a high iodine value is preferred.

However, although the description of the literature suggests the direction of improvement of the covulcanizability of EPDM and a diene rubber, there is no description as to actual products, especially, product quality items needed when dynamic strength is required and the above technologies cannot realize the properties desired in the present invention at all.

The object of blending EPDM with a diene rubber resides in the realization of excellent heat aging and weather resistances without practical deterioration of the excellent abrasion, dynamic fatigue and crack growth resistances possessed by the diene rubber. Thus, the EPDM to be blended with the diene rubber must also be provided with dynamic fatigue resistance.

Rubber Chemistry Technology, vol. 44, October 1971, p1043 mentioned a rubber vibration insulator material as a member most required to possess dynamic fatigue resistance, and it is described there that the use of a high molecular weight EPDM of high Mooney viscosity as a rubber vibration insulator material enables obtaining a vulcanized rubber being excellent in dynamic fatigue resistance.

However, the use of a high molecular weight EPDM would be thought of by any one skilled in the art to which the present invention pertains. The matter to which the most intensive research and development efforts should be directed is to improve the covulcanizability with a diene rubber which has been the drawback of conventional EPDM.

With respect to the method of improving the covulcanizability of EPDM and a diene rubber, it has been attempted to effect a terpolymerization of ethylene and propylene with each of new dienes of high vulcanization velocity in place of the conventional ethylidenenorbornene.

However, the covulcanizability with a diene rubber is still unsatisfactory with respect to the EPDMs obtained by the attempted terpolymerization using such new dienes.

Therefore, there is a demand for the developments of an ethylene/α-olefin/nonconjugated polyene terpolymer rubber whose vulcanization velocity is on the same level as that of a diene rubber, and an ethylene/α-olefin/nonconjugated polyene terpolymer rubber composition which enables providing a vulcanized rubber having excellent resistances to weather, ozone and heat aging without detriment to the excellent mechanical properties, abrasion resistance and dynamic fatigue resistance possessed by the diene rubber and a vulcanized rubber obtained from the composition.

As mentioned above, EPDM has no unsaturated bond in the principal chain of its molecular structure, so that it has excellent resistances to weather, ozone and heat aging as compared with those of the customary diene rubbers. Consequently, EPDM is widely used in, for example, rubber parts for electrical and electronic appliances and for civil work and construction.

Examples of suitable EPDMs include ethylene/propylene/dicyclopentadiene, ethylene/propylene/1,4-hexadiene and ethylene/propylene/5-ethylidene-2-norbornene terpolymer rubbers. Of these, ethylene/propylene/5-ethylidene-2-norbornene terpolymer rubber whose vulcanization velocity is high is especially widely employed.

However, even the ethylene/propylene/5-ethylidene-2-norbornene terpolymer rubber has the drawback that its vulcanization velocity is low as compared with that of a diene rubber such as natural rubber (NR), styrene/butadiene rubber (SBR), butadiene rubber (BR) or nitrile rubber (NBR) and that its covulcanizability with a diene rubber is poor. Further, with respect to the ethylene/propylene/5-ethylidene-2-norbornene terpolymer rubber, it is difficult to shorten the vulcanization time for enhancing the productivity of vulcanized rubber products or to lower the vulcanization temperature for reducing the energy consumption during the vulcanization.

The velocity of vulcanization of the conventional EPDM can be increased by increasing the amounts of vulcanizer and vulcanization accelerator. However, the use of vulcanizer and vulcanization accelerator in large amounts would cause the surface of the final vulcanized rubber product to suffer from blooming of the vulcanizer and vulcanization accelerator, so that design and hygienic problems would be encountered.

Therefore, it is desired to achieve the developments of an ethylene/α-olefin/nonconjugated polyene terpolymer rubber composition which enables providing a vulcanized rubber having excellent resistances to heat aging, weather and ozone and whose vulcanization velocity is high as compared with that of the conventional EPDM and a vulcanized rubber obtained from the composition.

OBJECT OF THE INVENTION

A primary object of the present invention is to provide an ethylene/α-olefin/nonconjugated polyene terpolymer rubber composition which enables providing a vulcanized rubber being excellent in resistances to weather, ozone and heat aging without detriment to the excellent mechanical strength characteristics, abrasion resistance and dynamic fatigue resistance of the diene rubber and a vulcanized rubber obtained from the composition.

A second object of the present invention is to provide an ethylene/α-olefin/nonconjugated polyene terpolymer rubber which enables providing a vulcanized rubber being excellent in not only strength characteristics and oil resistance but also resistances to weather, ozone and heat aging and a vulcanized rubber obtained from the composition.

A third object of the present invention is to provide an ethylene/α-olefin/nonconjugated polyene terpolymer rubber composition which enables providing a vulcanized rubber being excellent in resistances to heat aging, weather and ozone and whose vulcanization velocity is greater than that of the conventional EPDM and a vulcanized rubber obtained from the composition.

SUMMARY OF THE INVENTION

An ethylene/α-olefin/nonconjugated polyene terpolymer rubber composition according to the present invention comprises:
  a random terpolymer rubber (A) prepared from ethylene, an α-olefin having 3 to 20 carbon atoms and at least one branched chain polyene compound represented by the following general formula [I] and
  a diene rubber (B),
  the above random terpolymer rubber (A) being characterized by:
    (i) having a molar ratio of ethylene to an α-olefin having 3 to 20 carbon atoms (ethylene units/α-olefin units) of 40/60 to 95/5,
    (ii) exhibiting an iodine value of 1 to 50, and
    (iii) having an intrinsic viscosity [η] measured in 135° C. decalin which satisfies the inequality:
      0.8 dl/g<[η]<5.0 dl/g, the above branched chain polyene compound being represented by the general formula:

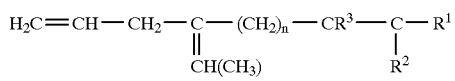

wherein n is an integer of 1 to 5, $R^1$ represents an alkyl group having 1 to 5 carbon atoms, and each of $R^2$ and $R^3$ independently represents a hydrogen atom or an alkyl group having 1 to 5 carbon atoms.

It is preferred that the diene rubber (B) be natural rubber (NR) or isoprene rubber (IR).

A vulcanized rubber of the present invention is produced by a process comprising vulcanizing the above composition comprising the random terpolymer rubber (A) and the diene rubber (B).

Another form of ethylene/α-olefin/nonconjugated polyene terpolymer rubber composition of the present invention comprises:

a random terpolymer rubber (A) prepared from ethylene, an α-olefin having 3 to 20 carbon atoms and at least one branched chain polyene compound represented by the above general formula [I] and a nitrile rubber (C), the above random terpolymer rubber (A) being characterized by:
(i) having a molar ratio of ethylene to an α-olefin having 3 to 20 carbon atoms (ethylene units/α-olefin units) of 40/60 to 95/5,
(ii) exhibiting an iodine value of 1 to 50, and
(iii) having an intrinsic viscosity [η] measured in 135° C. decalin which satisfies the inequality:
0.8 dl/g<[η]<5.0 dl/g.

Another form of vulcanized rubber of the present invention is produced by a process comprising vulcanizing the above ethylene/α-olefin/nonconjugated polyene terpolymer rubber composition of the present invention.

A further form of ethylene/α-olefin/nonconjugated polyene terpolymer rubber composition of the present invention comprises:

a random terpolymer rubber (A) prepared from ethylene, an α-olefin having 3 to 20 carbon atoms and at least one branched chain polyene compound represented by the above general formula [I] and a random copolymer rubber (D) prepared from ethylene and an α-olefin having 3 to 20 carbon atoms optionally together with a nonconjugated diene, the above random terpolymer rubber (A) being characterized by:
(i) having a molar ratio of ethylene to an α-olefin having 3 to 20 carbon atoms (ethylene units/α-olefin units) of 40/60 to 95/5,
(ii) exhibiting an iodine value of 5 to 40, and
(iii) having an intrinsic viscosity [η] measured in 135° C. decalin which satisfies the inequality:
0.8 dl/g<[η]<5.0 dl/g.

A further form of vulcanized rubber of the present invention is produced by a process comprising vulcanizing the above composition comprising the random terpolymer rubber (A) and the random copolymer rubber (D).

The above rubber composition comprising the random terpolymer rubber (A) and the diene rubber (B) enables providing a vulcanized rubber being excellent in resistances to weather, ozone and heat aging without detriment to the excellent mechanical strength characteristics, abrasion resistance and dynamic fatigue resistance of the diene rubber.

The above rubber composition comprising the random terpolymer rubber (A) and the nitrile rubber (C) enables providing a vulcanized rubber being excellent in not only strength characteristics and oil resistance but also resistances to weather, ozone and heat aging.

The above rubber composition comprising the random terpolymer rubber (A) and the random copolymer rubber (D) enables providing a vulcanized rubber which is excellent in resistances to heat aging, weather and ozone and has the advantage of having vulcanization velocity greater than that of the conventional EPDM.

DETAILED DESCRIPTION OF THE INVENTION

The ethylene/α-olefin/nonconjugated polyene terpolymer rubber composition and vulcanized rubber obtained therefrom according to the present invention will be described in detail below.

The ethylene/α-olefin/nonconjugated polyene terpolymer rubber composition of the present invention is specifically a rubber composition (I) comprising a random terpolymer rubber (A) and a diene rubber (B), a rubber composition (II) comprising the random terpolymer rubber (A) and a nitrile rubber (C) or a rubber composition (III) comprising the random terpolymer rubber (A) and a random copolymer rubber (D).

Random Terpolymer Rubber (A)

The ethylenic terpolymer rubber (A) for use in the present invention is prepared from ethylene, an α-olefin having 3 to 20 carbon atoms and a branched chain polyene compound.

Various α-olefins each having 3 to 20 carbon atoms may suitably be employed, which include, for example, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicocene. Of these, propylene, 1-butene, 1-hexene and 1-octene are preferred.

These α-olefins may be used either individually or in combination.

The branched chain polyene compound is represented by the general formula [I]:

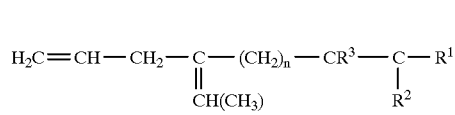

In the formula [I], n is an integer of 1 to 5, $R^1$ represents an alkyl group having 1 to 5 carbon atoms, and each of $R^2$ and $R^3$ independently represents a hydrogen atom or an alkyl group having 1 to 5 carbon atoms.

Examples of the alkyl groups each having 1 to 5 carbon atoms include methyl, ethyl, n-propyl, i-propyl, n-butyl, i-butyl, sec-butyl, t-butyl, n-pentyl and i-pentyl groups.

Examples of the above branched chain polyene compounds (hereinafter also referred to as the branched chain polyene compound [I]) include the following compounds (1) to (24):

(1) 4-ethylidene-1,6-octadiene,
(2) 7-methyl-4-ethylidene-1,6-octadiene,
(3) 7-methyl-4-ethylidene-1,6-nonadiene,
(4) 7-ethyl-4-ethylidene-1,6-nonadiene,
(5) 6,7-dimethyl-4-ethylidene-1,6-octadiene,
(6) 6,7-dimethyl-4-ethylidene-1,6-nonadiene,
(7) 4-ethylidene-1,6-decadiene,
(8) 7-methyl-4-ethylidene-1,6-decadiene,
(9) 7-methyl-6-propyl-4-ethylidene-1,6-octadiene,
(10) 4-ethylidene-1,7-nonadiene,
(11) 8-methyl-4-ethylidene-1,7-nonadiene (EMN),
(12) 4-ethylidene-1,7-undecadiene,
(13) 8-methyl-4-ethylidene-1,7-undecadiene,
(14) 7,8-dimethyl-4-ethylidene-1,7-nonadiene,
(15) 7,8-dimethyl-4-ethylidene-1,7-decadiene,
(16) 7,8-dimethyl-4-ethylidene-1,7-undecadiene,
(17) 8-methyl-7-ethyl-4-ethylidene-1,7-undecadiene,
(18) 7,8-diethyl-4-ethylidene-1,7-decadiene,

(19) 9-methyl-4-ethylidene-1,8-decadiene,
(20) 8,9-dimethyl-4-ethylidene-1,8-decadiene,
(21) 10-methyl-4-ethylidene-1,9-undecadiene,
(22) 9,10-dimethyl-4-ethylidene-1,9-undecadiene,
(23) 11-methyl-4-ethylidene-1,10-dodecadiene, and
(22) 10,11-dimethyl-4-ethylidene-1,10-dodecadiene.

Of these, the branched chain polyene compounds (5), (6), (9), (11), (14), (19) and (20) are preferably employed.

These may be used either individually or in combination.

The above branched chain polyene compound [I] may be either a mixture of trans and cis forms or purely a trans or cis form.

The above branched chain polyene compound [I] can be prepared by the process described in the specification of Japanese Patent Application No. 6(1994)-154952 filed by the same applicant as in the present application.

The branched chain polyene compound [I] can be produced by reacting a conjugated diene compound represented by the following formula [I-a] with ethylene in the presence of a catalyst composed of a transition metal compound and an organoaluminum compound:

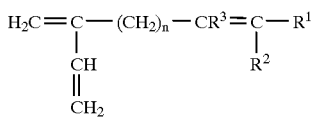

[I-a]

wherein the meanings of n, $R^1$, $R^2$ and $R^3$ are the same as mentioned above with respect to the formula [I].

In the random terpolymer rubber (A) for use in the present invention, the structural units derived from the above monomers of ethylene, α-olefin and branched chain polyene compound are randomly arranged and mutually bonded, a branch structure is present attributed to the branched chain polyene compound and the principal chain has a substantially linear structure.

That this terpolymer rubber has a substantially linear structure and contains substantially no gel of crosslinked polymer can be confirmed by the fact that the terpolymer rubber is soluble in an organic solvent and contains substantially no insoluble matter. For example, the confirmation can be made by the fact that the terpolymer rubber is completely dissolved in decalin at 135° C. in the measurement of the intrinsic viscosity [η].

In this random terpolymer rubber (A), each structural unit derived from the branched chain polyene compound has substantially the structure represented by the formula [II]:

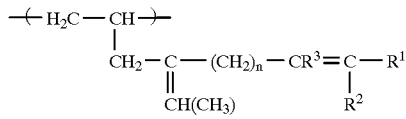

[II]

wherein the meanings of n, $R^1$, $R^2$ and $R^3$ are the same as mentioned above with respect to the formula [I].

That each structural unit derived from the branched chain polyene compound has the above structure can be confirmed by obtaining $^{13}$C-NMR spectrum of the terpolymer.

The random terpolymer rubber (A) for use in the rubber composition (I) has the following components and properties.

(i) The random terpolymer rubber has a molar ratio of ethylene to an α-olefin having 3 to 20 carbon atoms (ethylene units/α-olefin units) of 40/60 to 95/5, preferably, 50/50 to 80/20 and, still preferably, 60/40 to 78/22.

The use of the random terpolymer rubber (A) having the above range of molar ratio of ethylene to an α-olefin having 3 to 20 carbon atoms leads to the rubber composition (I) which enables providing a vulcanized rubber product being excellent in mechanical strength characteristics without detriment to the rubber elasticity at low temperatures.

(ii) The random terpolymer rubber (A) exhibits an iodine value of 1 to 50, preferably, 5 to 40 and, still preferably, 10 to 30.

The random terpolymer rubber (A) exhibiting the above range of iodine value has high vulcanization velocity to thereby ensure high covulcanizability with diene rubber and is excellent in heat aging resistance.

(iii) The random terpolymer rubber (A) has an intrinsic viscosity [η] measured in 135° C. decalin which generally ranges from 0.2 to 10 dl/g and preferably satisfies the inequality:

0.8 dl/g<[η]<5.0 dl/g.

The random terpolymer rubber (A) having the above range of intrinsic viscosity [η] is excellent in an ability for blending with diene rubber and covulcanizability with diene rubber. The use of the random terpolymer rubber (A) having the above range of intrinsic viscosity [η] leads to the rubber composition (I) having excellent processability.

The random terpolymer rubber (A) for use in the rubber composition (II) has the following construction and properties.

(i) The random terpolymer rubber has a molar ratio of ethylene to an α-olefin having 3 to 20 carbon atoms (ethylene units/α-olefin units) of 40/60 to 95/5, preferably, 55/45 to 80/20 and, still preferably, 60/40 to 78/22.

The use of the random terpolymer rubber (A) having the above range of molar ratio of ethylene to an α-olefin having 3 to 20 carbon atoms leads to the rubber composition (II) which enables providing a vulcanized rubber being excellent in mechanical strength characteristics without detriment to the rubber elasticity at low temperatures.

(ii) The random terpolymer rubber (A) exhibits an iodine value of 1 to 50, preferably, 10 to 30 and, still preferably, 11 to 25.

The random terpolymer rubber (A) exhibiting the above range of iodine value has high vulcanization velocity to thereby ensure high covulcanizability with nitrile rubber and is excellent in heat aging resistance.

The use of the random terpolymer rubber (A) exhibiting the above range of iodine value leads to the rubber composition (II) which enables providing a vulcanized rubber being excellent in not only strength characteristics and oil resistance but also resistances to weather, ozone and heat aging.

(iii) The random terpolymer rubber (A) has an intrinsic viscosity [η] measured in 135° C. decalin which generally ranges from 0.2 to 10 dl/g and preferably satisfies the inequality:

0.8 dl/g <[η]<5.0 dl/g.

The random terpolymer rubber (A) having the above range of intrinsic viscosity [η] is excellent in an ability for blending with nitrile rubber and covulcanizability with nitrile rubber. The use of the random terpolymer rubber (A) having the above range of intrinsic viscosity [η] leads to the rubber composition (II) having excellent processability.

The random terpolymer rubber (A) for use in the rubber composition (III) has the following components and properties.

(i) The random terpolymer rubber (A) has a molar ratio of ethylene to an α-olefin having 3 to 20 carbon atoms (ethylene units/α-olefin units) of 40/60 to 95/5, preferably, 50/50 to 90/10 and, still preferably, 50/50 to 85/15.

The use of the random terpolymer rubber (A) having the above range of molar ratio of ethylene to an α-olefin having 3 to 20 carbon atoms leads to the rubber composition (III) which enables providing a vulcanized rubber product being excellent in not only mechanical strength characteristics but also blooming resistance.

(ii) The random terpolymer rubber (A) exhibits an iodine value of 5 to 40, preferably, 5 to 35 and, still preferably, 8 to 30.

The use of the random terpolymer rubber (A) exhibiting the above range of iodine value leads to the rubber composition (III) of high vulcanization velocity which enables providing a vulcanized rubber product being excellent in blooming resistance.

(iii) The random terpolymer rubber (A) has an intrinsic viscosity [η] measured in 135° C. decalin which satisfies the inequality:

0.8 dl/g <[η]<5.0 dl/g.

The use of the random terpolymer rubber (A) having the above range of intrinsic viscosity [η] leads to the rubber composition (III) having excellent processability.

In the rubber composition (I), the random terpolymer rubber (A) is contained in an amount of 20 to 80 parts by weight, preferably, 25 to 75 parts by weight and, still preferably, 30 to 70 parts by weight per 100 parts by weight of the sum of the random terpolymer rubber (A) and the diene rubber (B). The use of the random terpolymer rubber (A) in the above amount leads to the rubber composition (I) which enables providing a vulcanized rubber having excellent weather and heat resistances without detriment to the excellent mechanical strength characteristics under dynamic use conditions inherently possessed by the diene rubber.

In the rubber composition (II), the random terpolymer rubber (A) is contained in an amount of 20 to 80 parts by weight, preferably, 25 to 75 parts by weight and, still preferably, 30 to 70 parts by weight per 100 parts by weight of the sum of the random terpolymer rubber (A) and the nitrile rubber (C).

In the rubber composition (III), the random terpolymer rubber (A) is contained in an amount of 5 to 95 parts by weight, preferably, 20 to 90 parts by weight and, still preferably, 30 to 90 parts by weight per 100 parts by weight of the sum of the random terpolymer rubber (A) and the random copolymer rubber (D).

The above random terpolymer rubber (A) can be obtained by terpolymerizing ethylene, an α-olefin having 3 to 20 carbon atoms and a branched chain polyene compound represented by the above formula [I] in the presence of a catalyst.

A Ziegler catalyst composed of a compound of transition metal, such as vanadium (V), zirconium (Zr) or titanium (Ti), and an organoaluminum compound (organoaluminum oxy compound) may be used as the catalyst.

In the present invention, it is especially preferred to use a catalyst (a) composed of a soluble vanadium compound and an organoaluminum compound or a catalyst (b) composed of a metallocene compound of a transition metal selected from among the Group IVB of the periodic table and either an organoaluminum oxy compound or an ionized ionic compound.

In the present invention, generally, ethylene, an α-olefin having 3 to 20 carbon atoms and a branched chain polyene compound are terpolymerized in a liquid phase in the presence of the above catalyst (a) (composed of a soluble vanadium compound and an organoaluminum compound) or catalyst (b) (composed of a metallocene compound of a transition metal selected from among the Group IVB of the periodic table and either an organoaluminum oxy compound or an ionized ionic compound).

In the terpolymerization, generally, use is made of a hydrocarbon solvent. In place of the hydrocarbon solvent, however, an α-olefin such as propylene may be used as the solvent.

Examples of suitable hydrocarbon solvents include:
aliphatic hydrocarbons such as pentane, hexane, heptane, octane, decane, dodecane and kerosene, and halogenated derivatives thereof,
alicyclic hydrocarbons such as cyclohexane, methylcyclopentane and methylcyclohexane, and halogenated derivatives thereof, and
aromatic hydrocarbons such as benzene, toluene and xylene, and halogenated derivatives thereof such as chlorobenzene.

These solvents may be used either individually or in combination.

The terpolymerization of ethylene, an α-olefin having 3 to 20 carbon atoms and a branched chain polyene compound may be performed in either a batch or a continuous process. In the execution of the terpolymerization according to the continuous process, the above catalyst is used in the following concentration.

When use is made of the above catalyst (a), namely, the catalyst composed of a soluble vanadium compound and an organoaluminum compound in the present invention, the concentration of the soluble vanadium compound in the polymerization system ranges generally from 0.01 to 5 mmol/liter (polymerization volume), preferably, from 0.05 to 3 mmol/liter. The soluble vanadium compound is fed in a concentration of not greater than 10 times, preferably, 1 to 7 times and, still preferably, 1 to 5 times the concentration of the soluble vanadium compound in the polymerization system.

On the other hand, the organoaluminum compound is fed at an atomic ratio of aluminum to vanadium present in the polymerization system (Al/V) of at least 2, preferably, 2 to 50 and, still preferably, 3 to 20.

The catalyst (a) composed of the soluble vanadium compound and the organoaluminum compound is generally diluted with the above hydrocarbon solvent and/or liquid α-olefin having 3 to 20 carbon atoms and branched chain polyene compound before being fed in the polymerization system. In this dilution, it is preferred that the soluble vanadium compound be diluted in the above concentration and that the concentration of the organoaluminum compound be regulated to an arbitrary concentration of, for example, not greater than 50 times the concentration in the polymerization system before being fed thereinto.

When use is made of the catalyst (b) composed of a metallocene compound and either an organoaluminum oxy compound or an ionized ionic compound (also referred to as "ionic ionized compound" or "ionic compound") in the present invention, the concentration of metallocene compound in the polymerization system ranges generally from 0.00005 to 0.1 mmol/liter (polymerization volume), preferably, 0.0001 to 0.05 mmol/liter.

The organoaluminum oxy compound is fed at an atomic ratio of aluminum to metallocene compound present in the polymerization system (Al/transition metal) of 1 to 10,000, preferably, 10 to 5000.

On the other hand, the ionized ionic compound is fed at a molar ratio of ionized ionic compound to metallocene compound present in the polymerization system (ionized ionic compound/metallocene compound) of 0.5 to 20, preferably, 1 to 10.

When the organoaluminum compound is employed, it is generally used in an amount of about 0 to 5 mmol/liter (polymerization volume), preferably, about 0 to 2 mmol/liter.

In the terpolymerization of ethylene, an α-olefin having 3 to 20 carbon atoms and a branched chain polyene compound in the presence of the catalyst (a) composed of the soluble vanadium compound and the organoaluminum compound according to the present invention, the reaction is generally carried out at a temperature of −50 to 100° C., preferably, −30 to 80° C. and, still preferably, −20 to 60° C. under a pressure of 50 kg/cm$^2$ or less, preferably, 20 kg/cm$^2$ or less provided that the pressure does not become zero.

In the terpolymerization of ethylene, an α-olefin having 3 to 20 carbon atoms and a branched chain polyene compound in the presence of the catalyst (b) composed of the metallocene compound and either the organoaluminum oxy compound or the ionized ionic compound according to the present invention, the reaction is generally carried out at a temperature of −20 to 150° C., preferably, 0 to 120° C. and, still preferably, 0 to 100° C. under a pressure of 80 kg/cm$^2$ or less, preferably, 50 kg/cm$^2$ or less provided that the pressure does not become zero.

Although depending on the catalyst concentration, the polymerization temperature and other conditions, the reaction time (average residence time when the terpolymerization is conducted according to the continuous process) generally ranges from 5 min to 5 hr, preferably, 10 min to 3 hr.

In the present invention, ethylene, an α-olefin having 3 to 20 carbon atoms and a branched chain polyene compound are fed into the polymerization system in amounts such that the above random terpolymer rubber of specified composition is obtained. A molecular weight modifier such as hydrogen may be used in the terpolymerization.

As a result of the above terpolymerization of ethylene, an α-olefin having 3 to 20 carbon atoms and a branched chain polyene compound, the random terpolymer rubber is obtained generally in the form of a polymer solution containing the same, which is treated by the customary procedure to thereby obtain the desired random terpolymer rubber.

The above process for producing the random terpolymer rubber (A) "unsaturated ethylenic copolymer" is described in detail in the specification of Japanese Patent Application No. 7(1995)-69986 filed by the same applicant as in the present application.

Diene Rubber (B)

Examples of suitable diene rubbers (B) for use in the rubber composition (I) include natural rubber (NR), isoprene rubber (IR), butadiene rubber (BR), styrene/butadiene rubber (SBR), acrylonitrile/butadiene rubber (NBR) and chloroprene rubber (CR). Of these, isoprene rubbers, namely, natural rubber (NR) and isoprene rubber (IR) are preferred which are well balanced in mechanical strength characteristics.

These diene rubbers may be used either individually or in combination.

The diene rubber (B) is used in an amount of 20 to 80 parts by weight, preferably, 25 to 75 parts by weight and, still preferably, 30 to 70 parts by weight per 100 parts by weight of the sum of the random terpolymer rubber (A) and the diene rubber (B).

Nitrile Rubber (C)

The nitrile rubber for use in the rubber composition (II) is a copolymer composed mainly of butadiene and acrylonitrile units. In particular, use is made of nitrile rubbers each having an acrylonitrile content of 10 to 40% by weight and a Mooney viscosity [$ML_{1+4}(100°$ C.$)$] of 20 to 100.

These nitrile rubbers may be used either individually or in combination.

The nitrile rubber (C) is used in an amount of 20 to 80 parts by weight, preferably, 25 to 75 parts by weight and, still preferably, 30 to 70 parts by weight per 100 parts by weight of the sum of the random terpolymer rubber (A) and the nitrile rubber (C).

Random Copolymer Rubber (D)

The random copolymer rubber (D) for use in the rubber composition (III) is prepared from ethylene and an α-olefin having 3 to 20 carbon atoms optionally together with a nonconjugated diene.

The random copolymer rubber (D) for use in the rubber composition (III) has an ethylene content of 50 to 90 mol%, preferably, 60 to 85 mol %.

Various α-olefins each having 3 to 20 carbon atoms may suitably be employed, which include, for example, propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicocene. These α-olefins may be used either individually or in combination. Of these, propylene and 1-butene are especially preferred.

Examples of the above nonconjugated dienes include chain nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Of these, 1,4-hexadiene, dicyclopentadiene and 5-ethylidene-2-norbornene are preferred, and 5-ethylidene-2-norbornene is especially preferred.

The random copolymer rubber (D) for use in the rubber composition (III) exhibits an iodine value as an index for the content of nonconjugated diene which ranges from 0 to 50, preferably, from 5 to 40.

This random copolymer rubber (D) has an intrinsic viscosity [η] measured in 135° C. decalin which generally ranges from 0.3 to 5 dl/g, preferably, 0.5 to 4 dl/g and, still preferably, 1 to 4 dl/g.

The above random copolymer rubber (D) can be produced in the same manner as the random terpolymer rubber (A).

The random copolymer rubber (D) is used in an amount of 5 to 95 parts by weight, preferably, 10 to 80 parts by weight and, still preferably, 10 to 70 parts by weight per 100 parts by weight of the sum of the random terpolymer rubber (A) and the random copolymer rubber (D).

Rubber Composition and Vulcanized Rubber Therefrom

Each of the above rubber compositions (I), (II) and (III) may contain carbon black such as SRF, GPF, FEF, HAF, ISAF, SAF, FT or MT, a rubber reinforcement such as a particulate silicate and/or a filler such as precipitated calcium carbonate, heavy calcium carbonate, talc or clay.

Although the type and content of the above rubber reinforcement, filler, etc. may be appropriately selected depending on the use of the composition, the content thereof is generally up to 300 parts by weight, preferably, up to 200 parts by weight per 100 parts by weight of the sum of the random terpolymer rubber (A) and each of the diene rubber (B), nitrile rubber (C) and random copolymer rubber (D).

The random terpolymer rubber (A) as a component of the rubber composition (I) functions to improve the properties such as weather and ozone resistances of the vulcanized rubber and the diene rubber (B) as another component functions to improve the properties such as strength of the vulcanized rubber, so that a vulcanized rubber having high mechanical strength and excellent resistances to weather, ozone and dynamic fatigue can be obtained from the rubber composition (I).

Although being usable in the unvulcanized state, the rubber composition of the present invention can most fully exert its advantageous properties when used as a vulcanized rubber. That is, the random terpolymer rubber (A) as a component of the rubber composition (II) functions to improve the properties such as weather and ozone resistances of the vulcanized rubber and the nitrile rubber (C) as another component functions to improve the properties such as strength of the vulcanized rubber, so that a vulcanized rubber having high strength and excellent resistances to weather, ozone and dynamic fatigue can be obtained from the rubber composition (II).

The random terpolymer rubber (A) as a component of the rubber composition (III) functions to increase the vulcanization velocity of the random copolymer rubber (D), and both the random terpolymer rubber (A) and the random copolymer rubber (D) function to improve the properties such as weather and ozone resistances of the vulcanized rubber.

In the production of a vulcanized rubber from each of the rubber compositions (I), (II) and (III) of the present invention, the types and amounts of blended rubber reinforcement, filler and softener in addition to the above components (A) and (B), (C) or (D), the types and amounts of compounds such as vulcanizer, vulcanization accelerator and vulcanization auxiliary constituting the vulcanization system and the steps for producing the vulcanized rubber are appropriately selected depending on the intended use of the vulcanized rubber and the performance required for the use.

Any softener generally employed in rubbers may be used in the present invention. Petroleum-based softener, especially, process oil is preferred.

The amount of blended softener is up to 150 parts by weight, preferably, up to 100 parts by weight per 100 parts by weight of the sum of the component (A) and each of the components (B), (C) or (D).

In the production of the vulcanized rubber according to the present invention, a vulcanizer of sulfur per se or a sulfur compound is used as conventionally.

The above sulfur or sulfur compound is used in an amount of 0.1 to 5 parts by weight, preferably, 0.5 to 3 parts by weight per 100 parts by weight of the sum of the component (A) and each of the components (B), (C) or (D).

When a sulfur compound is used as a vulcanizer in the vulcanization of the rubber compositions (I), (II) and (III) of the present invention, it is preferred to employ a vulcanization accelerator in combination.

Conventional vulcanization accelerators can be used in the present invention. Each vulcanization accelerator is used in an amount of 0.1 to 20 parts by weight, preferably, 0.2 to 10 parts by weight per 100 parts by weight of the sum of the component (A) and each of the components (B), (C) or (D).

An unvulcanized compounded rubber can be prepared by the following procedure. That is, the component (A) and each of the components (B), (C) or (D) are blended together with a softener at 80 to 150° C. for 3 to 10 min by means of a mixer such as Banbury mixer. Subsequently, a vulcanizer optionally together with a vulcanization accelerator and/or a vulcanization auxiliary is added and blended by means of rolls such as open rolls at the roll temperature of 40 to 60° C. for 5 to 30 min. The blend is extruded into a ribbon- or sheet-shaped compounded rubber.

The thus prepared compounded rubber is formed into intended configuration by means of an extrusion molding machine, calendering rolls or a press, introduced in a vulcanization vessel simultaneously with or after the molding and heated at 120 to 270° C. for 1 to 30 min to thereby effect vulcanization. In the vulcanization, whether or not to use a metal mold is discretional. When no metal mold is used, the forming and vulcanization steps are generally carried out in a continuous manner.

The rubber composition (I) obtained by blending the above random terpolymer rubber (A) and diene rubber (B) in the above proportions is in the form of a rubber alloy. The vulcanized rubber product obtained from this rubber composition (I) is markedly improved in dynamic fatigue resistance which has been the drawback of the conventional EPDM and also in resistances to heat aging, weather and ozone which have been the drawbacks of the diene rubber.

Further, the rubber composition (II) obtained by blending the above random terpolymer rubber (A) and nitrile rubber (C) in the above proportions is in the form of a rubber alloy. The vulcanized rubber product obtained from this rubber composition (II) is markedly improved in oil resistance which has been the drawback of the conventional EPDM and also in heat resistance and low temperature flexibility which have been the drawbacks of the nitrile rubber (NBR).

EFFECT OF THE INVENTION

Of varied forms of the ethylene/α-olefin/nonconjugated polyene terpolymer rubber composition of the present invention, the rubber composition (I) comprising the random terpolymer rubber (A) and the diene rubber (B) enables providing a vulcanized rubber being excellent in resistances to weather, ozone and heat aging without detriment to the excellent mechanical strength characteristics, abrasion resistance and dynamic fatigue resistance of the diene rubber. Thus, the vulcanized rubber of the present invention obtained by vulcanizing the rubber composition (I) is excellent in mechanical strength characteristics and resistances to abrasion, dynamic fatigue, weather, ozone and heat aging.

Accordingly, the ethylene/α-olefin/nonconjugated polyene terpolymer rubber composition (I) and vulcanized rubber therefrom according to the present invention are suitable for use in automobile parts required to have excellent resistances to dynamic fatigue, heat and weather, such as a rubber vibration insulator, a tire side wall and a tire tread.

Further, of varied forms of the ethylene/α-olefin/nonconjugated polyene terpolymer rubber composition of the present invention, the rubber composition (II) comprising the random terpolymer rubber (A) and the nitrile rubber (C) enables providing a vulcanized rubber being excellent in not only strength characteristics and oil resistance but also resistances to weather, ozone and heat aging. Thus, the vulcanized rubber of the present invention obtained by vulcanizing the rubber composition (II) is excellent in not only strength characteristics and oil resistance but also resistances to weather, ozone and heat aging.

Accordingly, the ethylene/α-olefin/nonconjugated polyene terpolymer rubber composition (II) and vulcanized rubber therefrom according to the present invention are suitable for use in automobile parts required to have excellent resistances to oil, ozone and heat, such as an internal layer of air hose, a Freon hose and packings.

Still further, of varied forms of the ethylene/α-olefin/nonconjugated polyene terpolymer rubber composition of the present invention, the rubber composition (III) comprising the random terpolymer rubber (A) and the random copolymer rubber (D) enables providing a vulcanized rubber being excellent in resistances to heat aging, weather and ozone and is advantageous in that the vulcanization velocity thereof is greater than that of the conventional EPDM.

Thus, the vulcanized rubber of the present invention obtained by vulcanizing the rubber composition (III) is excellent in resistances to heat aging, weather and ozone.

Accordingly, the ethylene/α-olefin/nonconjugated polyene terpolymer rubber composition (III) and vulcanized rubber therefrom according to the present invention are suitable for use in various materials required to have excellent resistances to heat aging, weather and ozone which include automobile industrial parts such as a weather strip, a door glass run channel, a window frame, a radiator hose, brake parts and a wiper blade; industrial rubber products such as rubber rolls, a belt, packings and a hose; electrical insulating materials such as an anode cap and a grommet; civil engineering building materials such as a building gasket and a sheet for civil work; and rubber coated fabrics.

The present invention will further be illustrated with reference to the following examples which in no way limit the scope of the invention.

EXAMPLE

In Examples 1 to 5, Comparative Examples 1 to 5 and Referential Examples 1 to 3, the evaluation tests were carried out in the following manners.

[1] Testing of unvulcanized rubber property:

The property of unvulcanized rubber was tested in accordance with Japanese Industrial Standard K 6300. Torque change was measured at 160° C. with the use of Curelastmeter, model no. 3, manufactured by Japan Synthetic Rubber Co., Ltd. to thereby determine $t_{90}$ [min] as vulcanization velocity. The smaller the value of $t_{90}$ [min], the greater the vulcanization velocity.

[2] Degree of covulcanization:

The degree of covulcanization was calculated by the formula:

Degree of covulcanization [%]={$T_B$(blend)/[$T_B$(EPDM)×a+$T_B$(NBR)×b]}×100 wherein $T_B$(blend), $T_B$(EPDM), $T_B$(NBR), a and b respectively represent the tensile strength of actual blend material, that is the rubber composition, the tensile strength of the random terpolymer (A), that is ethylene/propylene/diene rubber (EPDM), the tensile strength of nitrile rubber (NBR), the weight proportion of ethylene/propylene/diene rubber (EPDM) and the weight proportion of nitrile rubber (NBR), provided that a+b=1.

[3] Tensile test:

The vulcanized rubber sheet was punched into dumbbell specimen No. 3 defined in Japanese Industrial Standard K 6301 (1989), with which the tensile test was conducted at 25° C. and at a tensile speed of 500 mm/min in the manner specified in paragraph 3 of Japanese Industrial Standard K 6301 to thereby measure 100% modulus ($M_{100}$), 200% modulus ($M_{200}$), 300% modulus ($M_{300}$), tensile stress at break ($T_B$) and tensile elongation at break ($E_B$).

[4] Testing of hardness:

The hardness was measured in accordance with Japanese Industrial Standard (JIS) K 6301 (1989) to thereby determine spring hardness Hs (JIS A-hardness).

[5] Testing of compression set:

The compression set (CS) was measured in accordance with Japanese Industrial Standard K 6301 (1989) with respect to the specimens aged at 100° C., 120° C. and 150° C. for 22 hr.

[6] Testing of oil resistance:

The oil resistance was tested in accordance with the immersion test specified in Japanese Industrial Standard K 6301. The specimen volume change ($\Delta V$ [%]) was measured, and further the ratio of change [Sc($T_B$)] of tensile stress at break ($T_B$), ratio of change [Sc($E_B$)] of tensile longation at break ($E_B$) and difference of JIS A-hardness (Hs) were measured in accordance with Japanese Industrial Standard K 6301.

JIS oil No. 3 was used in the test. The immersion test was conducted at 100° C. for 72 hr.

[7] Dynamic ozone resistance test:

The dynamic ozone resistance test was conducted in accordance with Japanese Industrial Standard K 6301 under conditions such that the ozone concentration, measuring temperature, elongation ratio (dynamic elongation) and frequency were 80 pphm, 40° C., 0→40% and 5 Hz, respectively. The cracking condition was inspected and evaluated 24 hr, 48 hr, 72 hr, 96 hr, 120 hr, 144 hr and 168 hr after the test start.

The polymers employed in Examples 1 to 5, Comparative Examples 1 to 5 and Referential Examples 1 to 3 were as follows:

EPT (1) ethylene/propylene/4-ethylidene-8-methyl-1,7-nonadiene terpolymer rubber (EMN-EPT1) having:
ethylene content: 61.8 mol%
iodine value: 23.7
intrinsic viscosity [η] measured in 135° C. decalin: 2.18 dl/g;

(2) ethylene/propylene/4-ethylidene-8-methyl-1,7-nonadiene terpolymer rubber (EMN-EPT2) having:
ethylene content: 58.1 mol%
iodine value: 37.5
intrinsic viscosity [η] measured in 135° C. decalin: 1.94 dl/g;

(3) ethylene/propylene/4-ethylidene-8-methyl-1,7-nonadiene terpolymer rubber (EMN-EPT2) having:
ethylene content: 55.7 mol%
iodine value: 50
intrinsic viscosity [η] measured in 135° C. decalin: 1.66 dl/g; and (4) ethylene/propylene/5-ethylidene-2-norbornene terpolymer rubber (ENB-EPT) having:
ethylene content: 68.0 mol%
iodine value: 22 intrinsic viscosity [η] measured in 135° C. decalin: 2.20 dl/g.

Nitrile rubber (1) nitrile rubber (NBR)

trade name: Nipol 1042 produced by Nippon Zeon Co., Ltd.

nitrile content (polar group content): 30%.

The above ethylene/propylene/4-ethylidene-8-methyl-1,7-nonadiene terpolymer rubber (EMN-EPT1) was prepared by the following procedure:

[Preparation of EMN-EPT1]

Terpolymerization of ethylene, propylene and the above 4-ethylidene-8-methyl-1,7-nonadiene (EMN) was continuously carried out with the use of a 15-liter polymerization reactor equipped with an agitating blade.

Dehydrated and purified hexane, a hexane solution of bis(1,3-dimethylcyclopentadienyl)zirconium dichloride (concentration: 0.05 mmol/liter), a hexane solution of triisobutylaluminum (concentration: 20 mmol/liter), a hexane slurry of methylaluminooxane (3 milligram atom/liter in terms of aluminum atoms) and a hexane solution of EMN (concentration: 0.25 liter/liter) were fed into the polymerization reactor from an upper part thereof at respective rates of 2 liter/hr, 0.2 liter/hr, 0.2 liter/hr, 1 liter/hr and 1.6 liter/hr.

Further, ethylene and propylene were fed at respective rates of 140 liter/hr and 660 liter/hr and hydrogen was fed at a rate such that the concentration thereof in the gas phase portion was held at 0.003 mol % into the polymerization reactor from an upper part thereof in a continuous manner. This terpolymerization reaction was conducted at 50° C.

The resultant polymer solution was withdrawn from the polymerization reactor from its lower part, and a small amount of methanol was added to terminate the polymerization reaction. A terpolymer was separated from the solvent by steam stripping and dried at 100° C. under the reduced pressure (100 mmHg) for 24 hr.

Thus, there was obtained the above ethylene/propylene/EMN terpolymer rubber (EMN-EPT1).

Moreover, the above EMN-EPT2 and EMN-EPT3 were obtained by the same procedure as in the preparation of EMN-EPT1.

EXAMPLE 1

[Production of vulcanized rubber]

The above ethylene/propylene/4-ethylidene-8-methyl-1,7-nonadiene terpolymer rubber (EMN-EPT1) as a random terpolymer rubber (A) was blended with commercially available Nipol 1042 (NBR) (produced by Nippon Zeon Co., Ltd.) as a nitrile rubber (C) at a ratio (NBR/EMN-EPT1) of 75/25 according to the recipe of Table 1, thereby obtaining an unvulcanized compounded rubber.

This blending was performed by means of a 1.7-liter Banbury mixer (manufactured by Kobe Steel, Ltd.) into which zinc oxide, stearic acid, HAF carbon black (trade name: Seast H produced by TOKAI CARBON CO., LTD.), dioctyl phthalate (DOP), oil (trade name: Sunthene 4240 produced by Japan Sun Oil Company, Ltd.) and antioxidant (trade name: Nocrac NS-6 produced by Ouchi Shinko Chemical Industry Co., Ltd.) were charged in addition to the above terpolymer rubber EMN-EPT1 and NBR. The filler ratio of the obtained blend was 70%.

Thereafter, vulcanization accelerator (trade name: Nocceler CZ produced by Ouchi Shinko Chemical Industry Co., Ltd.) and sulfur were added to the blend and milled by means of 8-inch rolls (front roll/rear roll: 65° C./65° C.), thereby obtaining a compounded rubber.

TABLE 1

| Component of composition | Proportion (pts. wt.) |
|---|---|
| EMN-EPT 1 | 25 |
| NBR | 75 |
| zinc oxide | 5 |
| stearic acid | 1 |
| HAF carbon black | 50 |
| dioctyl phthalate | 15 |
| oil | 10 |
| antioxidant | 1 |
| vulcanization accelerator | 1.2 |
| sulfur | 1.5 |

The above unvulcanized rubber property test was conducted of the thus obtained compounded rubber to thereby determine $t_{90}$ [min] (time required to effect 90% vulcanization). The result is given in Table 2.

The obtained compounded rubber was sheeted and heated under pressure by means of a 160° C. press for a period of $t_{90}$ min, thereby obtaining a vulcanized sheet of 2 mm in thickness. The above covulcanization degree, tensile, hardness, oil resistance and dynamic ozone tests were carried out of the vulcanized sheet.

Further, the compression set test was conducted of a vulcanized sheet of 2 mm in thickness obtained by heat pressing at 160° C. for a period of $t_{90}$ (min)+2 min.

The results are given in Table 2.

Examples 2 and 3 and Referential Example 1

The same procedure as in Example 1 was repeated except that the blend ratio of NBR to terpolymer rubber EMN-EPT1 (NBR/EMN-EPT1) was changed to each of 50/50, 25/75 and 0/100.

The results are given in Table 2.

TABLE 2

| | Ex. 1 | Ex. 2 | Ex. 3 | Ref. Ex. 1 |
|---|---|---|---|---|
| blend ratio NBR/EMN-EPT 1 | 75/25 | 50/50 | 25/75 | 0/100 |
| property of unvulcanized rubber | 5.3 | 6.1 | 6.9 | 8.5 |
| $t_{90}$ (106° C.) [min] | | | | |
| properties of vulcanized rubber | | | | |
| $M_{100}$ [kg/cm$^2$] | 22 | 27 | 28 | 24 |
| $M_{200}$ [kg/cm$^2$] | 53 | 54 | 50 | 53 |
| $M_{300}$ [kg/cm$^2$] | 83 | 77 | 72 | 84 |

TABLE 2-continued

|  | | | | |
|---|---|---|---|---|
| $T_B$ [kg/cm$^2$] | 170 | 161 | 152 | 146 |
| $E_B$ [%] | 470 | 390 | 460 | 480 |
| HS (JIS A) | 60 | 62 | 63 | 61 |
| CS [%] | | | | |
| 100° C. × 22 hrs. | 54 | 42 | 41 | 51 |
| 120° C. × 22 hrs. | 62 | 62 | 60 | 69 |
| 150° C. × 22 hrs. | 73 | 75 | 75 | 76 |
| oil resistance test (JIS Oil No. 3) | | | | |
| Δv [%] (100° C. × 72 hrs.) | 45 | 98 | 143 | 199 |
| Sc ($T_B$) [%] | −30 | −50 | −45 | −84 |
| Sc ($E_B$) [%] | −22 | −44 | −41 | −74 |
| ΔHs (JIS A) | −18 | −23 | −25 | −33 |
| deg. of covulcanization [%] | 95 | 96 | 97 | — |

|  | Ex. 1 | Ex. 2 | Ex. 3 | Ref. Ex. 1 | Comp. Ex. 1 | Comp. Ex. 2 | Comp. Ex. 3 | Comp. Ex. 4 | Comp. Ex. 5 |
|---|---|---|---|---|---|---|---|---|---|
| blend ratio of NBR/EPT | | | | | | | | | |
| NBR [pts. wt.] | 75 | 50 | 25 | 0 | 100 | 75 | 50 | 25 | 0 |
| EPT [pts. wt.] | 25 (EMN-EPT1) | 50 (EMN-EPT1) | 75 (EMN-EPT1) | 100 (EMN-EPT1) | 0 | 25 (ENB-EPT) | 50 (ENB-EPT) | 75 (ENB-EPT) | 100 (ENB-EPT) |
| ozone resistance test dynamic test (40° C. × 80 pphm) | | | | | | | | | |
| 24 hrs. | no* | no | no | no | broken | broken | no | no | no |
| 48 hrs. | no | no | no | no | | | no | no | no |
| 72 hrs. | no | no | no | no | | | no | no | no |
| 96 hrs. | no | no | no | no | | | no | no | no |
| 120 hrs. | no | no | no | no | | | no | no | no |
| 144 hrs. | no | no | no | no | | | no | no | no |
| 168 hrs. | no | no | no | no | | | no | no | no |

*no = no crack

Comparative Example 1

The same procedure as in Example 1 was repeated except that NBR was blended in an amount of 100 parts by weight and that no terpolymer rubber was employed.

The results are given in Tables 2 and 3.

Comparative Example 2

The same procedure as in Example 1 was repeated except that terpolymer rubber ENB-EPT was employed in place of terpolymer rubber EMN-EPT1 and that the blend ratio of NBR to terpolymer rubber ENB-EPT (NBR/ENB-EPT) was set at 75/25.

The results are given in Tables 2 and 3.

Comparative Example 3

The same procedure as in Example 1 was repeated except that terpolymer rubber ENB-EPT was employed in place of terpolymer rubber EMN-EPT1 and that the blend ratio of NBR to terpolymer rubber ENB-EPT (NBR/ENB-EPT) was set at 50/50.

The results are given in Tables 2 and 3.

Comparative Example 4

The same procedure as in Example 1 was repeated except that terpolymer rubber ENB-EPT was employed in place of terpolymer rubber EMN-EPT1 and that the blend ratio of NBR to terpolymer rubber ENB-EPT (NBR/ENB-EPT) was set at 25/75.

The results are given in Tables 2 and 3.

Comparative Example 5

The same procedure as in Example 1 was repeated except that terpolymer rubber ENB-EPT was employed in place of terpolymer rubber EMN-EPT1 and that the blend ratio of NBR to terpolymer rubber ENB-EPT (NBR/ENB-EPT) was set at 0/100.

The results are given in Tables 2 and 3.

TABLE 3

|  | Comp. Ex. | | | | |
|---|---|---|---|---|---|
|  | 1 | 2 | 3 | 4 | 5 |
| blend ratio NBR/ENB-EPT | 100/0 | 75/25 | 50/50 | 25/75 | 0/100 |
| property of unvulcanized rubber | | | | | |
| $t_{90}$ (160° C.) [min] | 6.1 | 9.3 | 11.0 | 13.0 | 24.2 |
| properties of vulcanized rubber | | | | | |
| $M_{100}$ [kg/cm$_2$] | 18 | 21 | 23 | 26 | 27 |
| $M_{200}$ [kg/cm$_2$] | 46 | 48 | 47 | 48 | 57 |
| $M_{300}$ [kg/cm$_2$] | 83 | 77 | 70 | 72 | 86 |
| $T_B$ [kg/cm$^2$] | 190 | 130 | 113 | 135 | 152 |
| $E_B$ [%] | 630 | 490 | 500 | 590 | 490 |
| Hs (JIS A) | 53 | 58 | 60 | 62 | 62 |
| CS [%] | | | | | |
| 100° C. × 22 hrs. | 46 | 47 | 50 | 49 | 57 |
| 120° C. × 22 hrs. | 67 | 66 | 68 | 70 | 73 |
| 150° C. × 22 hrs. | 76 | 75 | 77 | 78 | 80 |
| oil resistance test (JIS Oil No. 3) | | | | | |
| ΔV[%] (100° C. × 72 hrs.) | 13.2 | 55.0 | 124 | 185 | 197 |
| Sc ($T_B$) [%] | −3 | −33 | −61 | −55 | −85 |
| Sc ($E_B$) [%] | −13 | −26 | −53 | −51 | −76 |
| ΔHs (JIS A) | −4 | −21 | −32 | −36 | −34 |
| deg. of covulcanization [%] | — | 72 | 66 | 83 | — |

Example 4

The same procedure as in Example 1 was repeated except that terpolymer rubber EMN-EPT2 was employed in place of terpolymer rubber EMN-EPT1 and that the blend ratio of NBR to terpolymer rubber EMN-EPT2 (NBR/EMN-EPT2) was set at 50/50.

The results are given in Table 4.

Example 5

The same procedure as in Example 1 was repeated except that terpolymer rubber EMN-EPT3 was employed in place of terpolymer rubber EMN-EPT1 and that the blend ratio of NBR to terpolymer rubber EMN-EPT3 (NBR/EMN-EPT3) was set at 50/50.

The results are given in Table 4.

Referential Example 2

The same procedure as in Example 4 was repeated except that the blend ratio of NBR to terpolymer rubber EMN-EPT2 (NBR/EMN-EPT2) was changed to 0/100.

The results are given in Table 4.

Referential Example 3

The same procedure as in Example 5 was repeated except that the blend ratio of NBR to terpolymer rubber EMN-EPT3 (NBR/EMN-EPT3) was changed to 0/100.

The results are given in Table 4.

TABLE 4

| | Ex. 4 | Ex. 5 | Ref. Ex. 2 | Ref. Ex. 3 |
|---|---|---|---|---|
| blend ratio NBR/EMN-EPT 2 | 50/50 | — | 0/100 | — |
| NBR/EMN-EPT 3 | — | 50/50 | — | 0/100 |
| properties of vulcanized rubber | | | | |
| $T_B$ [kg/cm$^2$] | 156 | 157 | 130 | 125 |
| $E_B$ [%] | 430 | 370 | 480 | 420 |
| Hs (JIS A) | 60 | 62 | 61 | 62 |
| CS [%] 100° C. × 22 hrs. | 55 | 59 | 57 | 61 |
| oil resistance test (JIS oil No. 3) | | | | |
| ΔV [%] (100° C. × 72 hrs.) | 75 | 72 | 195 | 200 |
| deg. of con vulcanization | 98 | 100 | — | — |

The above results show the following.

Examples 1 to 3, Referential Example 1 and Comparative Examples 1 to 5 provide comparisons of oil resistance, ozone resistance and covulcanizability at varied blend ratios of NBR to EPT.

The EMN-EPT1 obtained by terpolymerization with the novel diene (EMN) has a vulcanization velocity ($t_{90}$) about twice greater than that of the conventional polymer, so that the covulcanizability with NBR being the object of the present invention has been remarkably improved. This improvement of covulcanizability enables obtaining a vulcanized rubber product which is excellent in oil and ozone resistances.

Examples 4 and 5 and Referential Examples 2 and 3 provide evaluation of the covulcanizability with NBR with respect to EMN-EPT2 and EMN-EPT3 obtained by terpolymerization with the novel diene (EMN) and exhibiting high iodine value.

It is seen from Example 5 that the use of EMN-EPT of high iodine value enables obtaining a vulcanized rubber product whose covulcanizability is 100%.

In Examples 6 to 9 and Comparative Example 6, the evaluation tests were carried out in the following manners.

[1] Testing of unvulcanized rubber property:

The property of unvulcanized rubber was tested in accordance with Japanese Industrial Standard K 6300. Torque change was measured at 150° C. with the use of Curelastmeter, model no. 3, manufactured by Japan Synthetic Rubber Co., Ltd. to thereby determine $t_{90}$ [min] as vulcanization velocity. The smaller the value of $t_{90}$ [min], the greater the vulcanization velocity.

[2] Degree of covulcanization:

The degree of covulcanization was determined in the same manner as mentioned hereinbefore except that the tensile strength $T_B$ (NR) of natural rubber (NR) used as a diene rubber (C) is employed in place of $T_B$ (NBR) and that the weight proportion thereof is used as the value b.

[3] Tensile test:

The vulcanized rubber sheet was punched into dumbbell specimen No. 3 defined in Japanese Industrial Standard K 6301 (1989), with which the tensile test was conducted at 25° C. and at a tensile speed of 500 mm/min in the manner specified in paragraph 3 of Japanese Industrial Standard K 6301 to thereby measure 100% modulus ($M_{100}$), 200% modulus ($M_{200}$), 300% modulus ($M_{300}$), tensile stress at break ($T_B$) and tensile elongation at break ($E_B$).

Further, the specimen was heat treated at 80° C. for 1 hr and subjected to the above tensile test to thereby measure the tensile stress at break ($T_B$) and tensile elongation at break ($E_B$).

[4] Testing of hardness:

The hardness was measured in accordance with Japanese Industrial Standard (JIS) K 6301 (1989) to thereby determine spring hardness Hs (JIS A-hardness).

Further, the specimen was heat treated at 80° C. for 1 hr and subjected to the above hardness test to thereby determine spring hardness Hs (JIS A-hardness).

[5] Aging test:

The tensile and hardness tests were carried out of the specimen before and after the heat treatment in accordance with the air heat aging test specified in Japanese Industrial Standard K 6301 to thereby measure the tensile stress at break ($T_B$), tensile elongation at break ($E_B$) and JIS A hardness (Hs). Thus, the ratio of change [Ac($T_B$)] of tensile stress at break ($T_B$), ratio of change [Ac($E_B$)] of tensile elongation at break ($E_B$) and difference [AH] of JIS A-hardness (Hs) were determined.

The testing condition is below:

Testing temperature: 100° C., and testing time (duration of heat treatment): 96 hr.

[6] Crack growth test (de Mattia flex test):

In the crack growth test, the resistance to crack growth was inspected with the use of de Mattia machine in accordance with ASTM D 813. The number of flexes before the occurrence of cracking and the number of flexes before the complete breakage of the specimen were measured (measuring temperature: 40° C. and rotational velocity: 300 rpm).

[7] Testing of fatigue in elongation (Monsanto fatigue test):

The vulcanized rubber sheet was punched into dumbbell specimen No. 1 defined in Japanese Industrial Standard K 6301, and a 2 mm notch was made at the center in the longitudinal direction of the specimen. 20 specimens were prepared in this manner and subjected to testing of the fatigue in elongation at elongations of 40%, 80% and 120% under conditions such that the measuring temperature was 40° C. and the rotational velocity 300 rpm. The average stress at dumbbell breakage and the average number of times at dumbbell breakage were measured.

Referential Example 4
[Preparation of random terpolymer rubber]

Terpolymerization of ethylene, propylene and the above 4-ethylidene-8-methyl-1,7-nonadiene (EMN) was continuously carried out with the use of a 15-liter polymerization reactor equipped with an agitating blade.

Dehydrated and purified hexane, a hexane solution of bis(1,3-dimethylcyclopentadienyl)zirconium dichloride (concentration: 0.05 mmol/liter), a hexane solution of triisobutylaluminum (concentration: 20 mmol/liter), a hexane slurry of methylaluminooxane (3 milligram atom/liter in terms of aluminum atoms) and a hexane solution of EMN (concentration: 0.12 liter/liter) were continuously fed into the polymerization reactor from an upper part thereof at respective rates of 2 liter/hr, 0.2 liter/hr, 0.2 liter/hr, 1 liter/hr and 1.6 liter/hr.

Further, ethylene and propylene were fed at respective rates of 180 liter/hr and 620 liter/hr and hydrogen was fed at a rate such that the concentration thereof in the gas phase portion was held at 0.004 mol % into the polymerization reactor from an upper part thereof in a continuous manner. This terpolymerization reaction was conducted at 50° C.

The resultant polymer solution was withdrawn from the polymerization reactor from its lower part, and a small amount of methanol was added to terminate the polymerization reaction. A terpolymer was separated from the solvent by steam stripping and dried at 100° C. under the reduced pressure (100 mmHg) for 24 hr.

Thus, there was obtained the above ethylene/propylene/EMN terpolymer rubber (EMN-EPT5).

The obtained ethylene/propylene/EMN terpolymer rubber (EMN-EPT5) had a molar ratio of ethylene to propylene (ethylene/propylene) of 71/29, an iodine value of 9 and an intrinsic viscosity [$\eta$] measured in 135° C. decalin of 2.77 dl/g.

Referential Examples 5 to 7

The same procedure as in Referential Example 4 was repeated to thereby obtain the ethylene/$\alpha$-olefin/EMN terpolymer rubbers (EMN-EPTs 6 to 8) specified in Table 5.

TABLE 5

| Terpolymer Rubber | EMN-EPT 5 Ref. Ex. 4 | EMN-EPT 6 Ref. Ex. 5 | EMN-EPT 7 Ref. Ex. 6 | EMN-EPT 8 Ref. Ex. 7 | ENB-EPT — |
|---|---|---|---|---|---|
| $\alpha$-olefin | propylene | propylene | propylene | propylene | propylene |
| polyene | EMN | EMN | EMN | EMN | ENB |
| ethylene/$\alpha$-olefin (mol. ratio) | 71/29 | 62/38 | 58/42 | 56/44 | 68/32 |
| iodine value | 9 | 24 | 38 | 50 | 22 |
| [$\eta$] (dl/g) | 2.77 | 2.18 | 1.94 | 1.66 | 2.20 |

(Note)
EMN: 4-ethylidene-8-methyl-1,7-nonadiene
ENB: 5-ethylidene-2-norbornene

Example 6
[Production of vulcanized rubber]

The above ethylene/propylene/4-ethylidene-8-methyl-1,7-nonadiene terpolymer rubber (EMN-EPT5) as a random terpolymer rubber (A) was blended with commercially available RSS #1 (NR) as a diene rubber (B) at a ratio (NR/EMN-EPT5) of 30/70 according to the recipe of Table 6, thereby obtaining an unvulcanized compounded rubber. This blending was performed by means of a 1.7-liter Banbury mixer (manufactured by Kobe Steel, Ltd.) into which zinc oxide (No. 1), stearic acid, FEF carbon black (trade name: Asahi #60HG produced by Asahi Carbon Co., LTD.), oil (trade name: Sunthene 4240 produced by Japan Sun Oil Company, Ltd.) and antioxidant (trade name: Nocrac 810-NA produced by Ouchi Shinko Chemical Industry Co., Ltd.) were charged in addition to the above terpolymer rubber EMN-EPT5 and NR. The filler ratio of the obtained blend was 70%.

Thereafter, vulcanization accelerator (trade name: Nocceler CZ produced by Ouchi Shinko Chemical Industry Co., Ltd.) and sulfur were added to the blend and milled by means of 8-inch rolls (front roll/rear roll: 65° C./65° C.), thereby obtaining a compounded rubber.

TABLE 6

| Component of composition | Proportion (pts. wt.) |
|---|---|
| EMN-EPT 1 | 70 |
| NR | 30 |
| zinc oxide No. 1 | 5 |
| stearic acid | 1 |
| FEF carbon black | 40 |
| paraffinic oil | 20 |
| antioxidant | 2.0 |
| vulcanization accelerator | 1.5 |
| sulfur | 1.5 |

The above unvulcanized rubber property test was conducted of the thus obtained compounded rubber to thereby determine $t_{90}$ [min] (time required to effect 90% vulcanization). The result is given in Table 7.

The obtained compounded rubber was sheeted and heated under pressure by means of a 160° C. press for a period of $t_{90}$ (min)+2 min, thereby obtaining a vulcanized sheet of 2 mm in thickness. The above covulcanization degree, tensile, hardness, aging, crack growth and fatigue in elongation tests were carried out of the vulcanized sheet.

The results are given in Table 7.

Example 7

The same procedure as in Example 6 was repeated except that EMN-EPT6 was employed in place of EMN-EPT5.

The results are given in Table 7.

Example 8

The same procedure as in Example 6 was repeated except that EMN-EPT7 was employed in place of EMN-EPT5.

The results are given in Table 7.

Example 9

The same procedure as in Example 6 was repeated except that EMN-EPT8 was employed in place of EMN-EPT5.

The results are given in Table 7.

Comparative Example 6

The same procedure as in Example 6 was repeated except that the ENB-EPT specified in Table 5 was employed in place of EMN-EPT5.

The results are given in Table 7.

TABLE 7

|  | Ex. 6 | Ex. 7 | Ex. 8 | Ex. 9 | Comp. Ex. 6 |
|---|---|---|---|---|---|
| Property of unvulcanized rubber $t_{90}$ (150° C.) [min.] | 8.7 | 8.5 | 8.3 | 8.0 | 11.0 |
| properties of vulcanized rubber |  |  |  |  |  |
| $M_{100}$ [kg/cm$^2$] | 17 | 16 | 17 | 18 | 16 |
| $M_{200}$ [kg/cm$^2$] | 43 | 45 | 44 | 47 | 35 |
| $M_{300}$ [kg/cm$^2$] | 70 | 75 | 72 | 83 | 62 |
| $T_B$ [kg/cm$^2$] | 160 | 135 | 152 | 175 | 125 |
| $E_B$ [%] | 500 | 500 | 520 | 510 | 520 |
| $H_S$ (JIS A) | 57 | 54 | 56 | 55 | 54 |
| high temperature strength (80° C.) |  |  |  |  |  |
| $T_B$ [kg/cm$^2$] | 109 | 110 | 122 | 149 | 63 |
| $E_B$ [%] | 510 | 540 | 560 | 570 | 470 |
| $H_S$ (JIS A) | 51 | 49 | 51 | 50 | 49 |
| heat aging resistance |  |  |  |  |  |
| $A_C(T_B)$ [%] | −29 | −27 | −29 | −29 | −28 |
| $A_C(E_B)$ [%] | −23 | −25 | −24 | −23 | −20 |
| AH (JIS A) | +2 | +2 | +2 | +1 | +2 |
| fatigue in elongation test |  |  |  |  |  |
| elongation 40% |  |  |  |  |  |
| stress [kg/cm$^2$] | 0.37 | 0.30 | 0.30 | 0.27 | 0.30 |
| No. of times at break (N) | 100,200 | 9,400 | 104,000 | 113,000 | 46,500 |
| elongation 80% |  |  |  |  |  |
| stress [kg/cm$^2$] | 0.90 | 0.87 | 0.87 | 0.87 | 0.87 |
| No. of times at break (N) | 24,000 | 22,000 | 23,000 | 24,300 | 10,030 |
| elongation 120% |  |  |  |  |  |
| stress [kg/cm$^2$] | 1.20 | 1.10 | 1.27 | 1.40 | 1.20 |
| No. of times at break (N) | 10,100 | 9,100 | 9,200 | 9,400 | 4,590 |
| crack growth resistance |  |  |  |  |  |
| No. of times at initial cracking | $2.0 \times 10^4$ | $2.5 \times 10^4$ | $2.7 \times 10^4$ | $2.9 \times 10^4$ | $1.5 \times 10^4$ |
| No. of times at specimen breakage | $1.9 \times 10^5$ | $2.1 \times 10^5$ | $2.5 \times 10^5$ | $3.0 \times 10^5$ | $1.4 \times 10^5$ |
| degree of covulcanization [%] | 85 | 93 | 98 | 100 | 72 |

In Examples 10 to 14 and Comparative Example 7, the evaluation tests were carried out in the following manners.

[1] Testing of unvulcanized rubber property:

The property of unvulcanized rubber was tested in accordance with Japanese Industrial Standard K 6300. Torque change was measured at 160° C. with the use of Curelastmeter, model no. 3, manufactured by Japan Synthetic Rubber Co., Ltd. to thereby determine $t_{90}$ [min] as vulcanization velocity. The smaller the value of $t_{90}$ [min], the greater the vulcanization velocity.

[2] Tensile test:

The vulcanized rubber sheet was punched into dumbbell specimen No. 3 defined in Japanese Industrial Standard K 6301 (1989), with which the tensile test was conducted at 25° C. and at a tensile speed of 500 mm/min in the manner specified in paragraph 3 of Japanese Industrial Standard K 6301 to thereby measure tensile stress at break ($T_B$) and tensile elongation at break ($E_B$).

[3] Testing of hardness:

The hardness was measured in accordance with Japanese Industrial Standard (JIS) K 6301 (1989) to thereby determine spring hardness Hs (JIS A-hardness).

[4] Aging test:

The tensile and hardness tests were carried out of the specimen before and after the heat treatment in accordance with the air heat aging test specified in Japanese Industrial Standard K 6301 to thereby measure the tensile stress at break ($T_B$), tensile elongation at break ($E_B$) and JIS A hardness (Hs). Thus, the ratio of change [$A_R(T_B)$] of tensile stress at break ($T_B$), ratio of change [$A_R(E_B)$] of tensile elongation at break ($E_B$) and difference [AH] of JIS A-hardness (Hs) were determined.

The testing condition is below:

Testing temperature: 100° C., and testing time (duration of heat treatment): 70 hr.

Referential Example 8

[Preparation of random terpolymer rubber]

Terpolymerization of ethylene, propylene and the above 4-ethylidene-8-methyl-1,7-nonadiene (EMN) was continuously carried out with the use of a 15-liter polymerization reactor of stainless steel equipped with an agitating blade.

Dehydrated and purified hexane, a hexane solution of bis(1,3-dimethylcyclopentadienyl)zirconium dichloride (concentration: 0.05 mmol/liter), a hexane solution of triisobutylaluminum (concentration: 20 mmol/liter), a hexane slurry of methylaluminooxane (3 milligram atom/liter in terms of aluminum atoms) and a hexane solution of EMN (concentration: 0.25 liter/liter) were continuously fed into the polymerization reactor from an upper part thereof at respective rates of 2 liter/hr, 0.2 liter/hr, 0.2 liter/hr, 1 liter/hr and 1.6 liter/hr.

Further, ethylene and propylene were fed at respective rates of 170 liter/hr and 630 liter/hr and hydrogen was fed at a rate such that the concentration thereof in the gas phase portion was held at 0.004 mol % into the polymerization reactor from an upper part thereof in a continuous manner. This terpolymerization reaction was conducted at 50° C.

The resultant polymer solution was withdrawn from the polymerization reactor from its lower part, and a small amount of methanol was added to terminate the polymerization reaction. A terpolymer was separated from the solvent by steam stripping and dried at 100° C. under the reduced pressure (100 mmHg) for 24 hr.

Thus, there was obtained the above ethylene/propylene/EMN terpolymer rubber (EMN-EPT9).

The obtained ethylene/propylene/EMN terpolymer rubber (EMN-EPT9) had a molar ratio of ethylene to propylene (ethylene/propylene) of 68/32, iodine value of 21 and an intrinsic viscosity [η] measured in 135° C. decalin of 2.4 dl/g.

Referential Examples 9 to 11

The same procedure as in Referential Example 8 was repeated to thereby obtain the ethylene/α-olefin/EMN terpolymer rubbers (EMN-EPTs 10 to 12) specified in Table

TABLE 8

| Terpolymer Rubber | EMN-EPT 9 Ref. Ex. 8 | EMN-EPT 10 Ref. Ex. 9 | EMN-EPT 11 Ref. Ex. 10 | EMN-EPT 12 Ref. Ex. 11 | ENB-EPT — |
|---|---|---|---|---|---|
| α-olefin | propylene | propylene | 1-butene | 1-octene | propylene |
| polyene | EMN | EMN | EMN | EMN | ENB |
| ethylene/α-olefin (mol. ratio) | 68/32 | 72/28 | 68/32 | 82/18 | 68/32 |
| iodine value | 21 | 32 | 19 | 22 | 22 |
| [η] (dl/g) | 2.4 | 2.7 | 1.9 | 2.1 | 2.2 |

(Note)
EMN: 4-ethylidene-8-methyl-1,7-nonadiene
ENB: 5-ethylidene-2-norbornene

Example 10

80 parts by weight of the ethylene/propylene/EMN terpolymer rubber (EMN-EPT9) obtained in Referential Example 8 as random terpolymer rubber (A), 20 parts by weight of ethylene/propylene/5-ethylidene-2-norbornene terpolymer rubber (ENB-EPT) [ethylene/propylene (molar ratio): 68/32, iodine value: 22, intrinsic viscosity [η]: 2.2 dl/g] synthesized by the conventional process as random copolymer rubber (D), 5 parts by weight of zinc oxide, 1 part by weight of stearic acid, 80 parts by weight of HAF carbon black (trade name: Seast 3 produced by TOKAI CARBON CO., LTD.) and 50 parts by weight of oil (trade name: Sunthene 4240 produced by Japan Sun Oil Company, Ltd.) were blended together by means of a 1.7-liter Banbury mixer (manufactured by Kobe Steel, Ltd.) for 5 min.

Thereafter, 1.5 parts by weight of sulfur, 0.5 part by weight of 2-mercaptobenzothiazole and 1 part by weight of tetramethylthiuram disulfide were added to the obtained blend and milled for 10 minutes by means of 8-inch rolls (front roll and rear roll are 50° C.), thereby obtaining a compounded rubber.

The obtained compounded rubber was vulcanized and shaped by heating at 160° C. for 10 min under a pressure of 150 kgf/cm² with the use of a hot press to thereby obtain a specimen, which was subjected to the above tests.

The results are given in Table 9.

Example 11

The same procedure as in Example 10 was repeated except that the amounts of blended EMN-EPT9 and ENB-EPT were changed to 60 parts by weight and 40 parts by weight, respectively.

The results are given in Table 9.

Example 12

The same procedure as in Example 10 was repeated except that the EMN-EPT10 of Referential Example 9 was employed in place of EMN-EPT9 and that the amounts of blended EMN-EPT10 and ENB-EPT were set at 30 parts by weight and 70 parts by weight, respectively.

The results are given in Table 9.

Example 13

The same procedure as in Example 10 was repeated except that the EMN-EPT11 of Referential Example 10 was employed in place of EMN-EPT9 and that the amounts of blended EMN-EPT11 and ENB-EPT were set at 70 parts by weight and 30 parts by weight, respectively.

The results are given in Table 9.

Example 14

The same procedure as in Example 10 was repeated except that the EMN-EPT12 of Referential Example 11 was employed in place of EMN-EPT9 and that the amounts of blended EMN-EPT12 and ENB-EPT were set at 70 parts by weight and 30 parts by weight, respectively.

The results are given in Table 9.

Comparative Example 7

The same procedure as in Example 10 was repeated except that the amounts of blended EMN-EPT9 and ENB-EPT were changed to 100 parts by weight and 0 part by weight, respectively.

The results are given in Table 9.

TABLE 9

| | Examples | | | | | Comp. Ex. |
|---|---|---|---|---|---|---|
| | 10 | 11 | 12 | 13 | 14 | 7 |
| wt. ratio of blended rubber component | | | | | | |
| terpolymer rubber (A) | | | | | | |
| EMN-EPT 9 | 80 | 60 | — | — | — | — |
| EMN-EPT 10 | — | — | 30 | — | — | — |
| EMN-EPT 11 | — | — | — | 70 | — | — |
| EMN-EPT 12 | — | — | — | — | 70 | — |
| copolymer rubber (D) | | | | | | |
| ENB-EPT | 20 | 40 | 70 | 30 | 30 | 100 |
| property of unvulcanized rubber | 7.2 | 8.3 | 8.9 | 7.6 | 7.1 | 11.5 |
| t$_{90}$ (160° C.) [min] | | | | | | |
| properties of vulcanized rubber | | | | | | |
| T$_B$ [kg/cm²] | 185 | 195 | 170 | 160 | 180 | 160 |
| E$_B$ [%] | 320 | 340 | 350 | 310 | 330 | 450 |
| Hs (JIS A) | 72 | 70 | 68 | 73 | 71 | 62 |
| heat aging resistance | | | | | | |
| A$_R$ (T$_B$) [%] | +6 | +8 | +9 | +4 | +5 | +18 |
| A$_R$ (E$_B$) [%] | −31 | −35 | −37 | −32 | −29 | −49 |
| AH (JIS A) | +4 | +6 | +7 | +4 | +4 | +11 |

What is claimed is:

1. An ethylene/α-olefin/nonconjugated polyene terpolymer rubber composition comprising:
a random terpolymer rubber (A) prepared from ethylene, an α-olefin having 3 to 20 carbon atoms and at least one branched chain polyene compound and
a diene rubber (B),
said random terpolymer rubber (A) being characterized by:
(i) having a molar ratio of ethylene to an α-olefin having 3 to 20 carbon atoms (ethylene units/α-olefin units) of 40/60 to 95/5,
(ii) exhibiting an iodine value of 1 to 50, and
(iii) having an intrinsic viscosity [η] measured in 135° C. decalin which satisfies the inequality:
8 dl/g<[η]<5.0 dl/g,
said branched chain polyene compound being represented by the general formula:

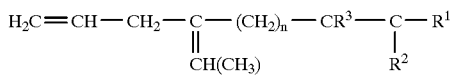

[I]

wherein n is an integer of 1 to 5,
$R^1$ represents an alkyl group having 1 to 5 carbon atoms, and
each of $R^2$ and $R^3$ independently represents a hydrogen atom or an alkyl group having 1 to 5 carbon atoms.

2. The ethylene/α-olefin/nonconjugated polyene terpolymer rubber composition as claimed in claim 1, wherein the random terpolymer rubber (A) is contained in an amount of 20 to 80 parts by weight and the diene rubber (B) is contained in an amount of 20 to 80 parts by weight per 100 parts by weight of the sum of the random terpolymer rubber (A) and the diene rubber (B).

3. A vulcanized rubber produced by a process comprising vulcanizing the ethylene/α-olefin/nonconjugated polyene terpolymer rubber composition of claim 1 or 2.

4. The ethylene/α-olefin/nonconjugated polyene terpolymer rubber composition of claim 1 wherein the random terpolymer rubber (A) has:
(i) a molar ratio of ethylene to α-olefin of 50/50 to 80/20, and
(ii) an iodine value of 5 to 40.

5. The composition of claim 1 wherein the diene rubber (B) is natural rubber, isoprene rubber, butadiene rubber, styrene/butadiene rubber, or chloroprene rubber.

6. The composition of claim 1 wherein the diene rubber (B) is natural rubber or isoprene rubber.

7. An ethylene/α-olefin/nonconjugated polyene terpolymer rubber composition comprising:
(1) a random terpolymer rubber (A) prepared from ethylene, an α-olefin having 3 to 20 carbon atoms and at least one branched chain polyene compound, and
(2) a rubber selected from the group consisting of (B) diene rubber, (C) nitrile rubber, and (D) a random copolymer rubber prepared from ethylene and an α-olefin having 3 to 20 carbon atoms, and optionally a nonconjugated diene,
said random terpolymer rubber (A) being characterized by:
(i) having a molar ratio of ethylene to an α-olefin having 3 to 20 carbon atoms (ethylene units/α-olefin units) of 40/60 to 95/5,
(ii) exhibiting an iodine value of 1 to 50 when the rubber (2) is the diene rubber (B) or nitrile rubber (C) or an iodine value of 5 to 40 when rubber (2) is the random copolymer rubber (D), and
(iii) having an intrinsic viscosity (η) measured in 135° C. decalin which satisfies the inequality:
0.8 dl/g <(η)<5.0 dl/g,
said branched chain polyene compound being represented by the general formula:

$$H_2C\!=\!\!CH\!-\!CH_2\!-\!\underset{\underset{CH(CH_3)}{\|}}{C}\!-\!(CH_2)_n\!-\!CR^3\!-\!\underset{\underset{R^2}{|}}{C}\!-\!R^1$$ [I]

wherein n is an integer of 1 to 5, $R^1$ represents an alkyl group having 1 to 5 carbon atoms, and each of $R^2$ and $R^3$ independently represents a hydrogen atom or an alkyl group having 1 to 5 carbon atoms.

8. An ethylene/α-olefin/nonconjugated polyene terpolymer rubber composition comprising:
(A) a random terpolymer rubber (A) prepared from ethylene, an α-olefin selected from the group consisting of propylene, 1-butene, 1-hexene and 1-octene, and at least one branched chain polyene compound selected from the group consisting of 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonadiene, 9-methyl-4-ethylidene-1,8-decadiene, and 8,9-dimethyl-4-ethylidene-1,8-decadiene; and
(B) a diene rubber;
said random terpolymer rubber (A) being characterized by:
(i) having a molar ratio of ethylene to the α-olefin of 40/60 to 95/5,
(ii) an iodine value of 1 to 50, and
(iii) an intrinsic viscosity (η) measured in decalin at 135° C. which satisfies the inequality:
0.8 dl/g <(η)<5.0 dl/g.

9. An ethylene/α-olefin/nonconjugated polyene terpolymer rubber composition comprising:
(A) a random terpolymer rubber (A) prepared from ethylene, an α-olefin having from 3 to 20 carbon atoms and at least one branched chain polyene compound selected from the group consisting of 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonadiene, 9-methyl-4-ethylidene-1,8-decadiene, and 8,9-dimethyl-4-ethylidene-1,8-decadiene; and
(B) a diene rubber;
said random terpolymer rubber (A) being characterized by:
(i) having a molar ratio of ethylene to the α-olefin of 40/60 to 95/5,
(ii) an iodine value of 1 to 50, and
(iii) an intrinsic viscosity (v) measured in decalin at 135° C. which satisfies the inequality:
0.8 dl/g<(η)<5.0 dl/g.

10. The composition of claim 9 wherein the diene rubber (B) is natural rubber, isoprene rubber, butadiene rubber, styrene/butadiene rubber, or chloroprene rubber.

11. An ethylene/α-olefin/nonconjugated polyene terpolymer rubber composition comprising:
(1) a random terpolymer rubber (A) prepared from ethylene, an α-olefin having 3 to 20 carbon atoms selected from the group consisting of propylene, 1-butene, 1-hexene and 1-octene, and at least one branched chain polyene compound selected from the group consisting of 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonadiene, 9-methyl-4-ethylidene-1,8-decadiene, and 8,9-dimethyl-4-ethylidene-1,8-decadiene; and
(2) a rubber selected from the group consisting of (B) diene rubber, (C) nitrile rubber, and (D) a random copolymer rubber prepared from ethylene and an α-olefin having 3 to 20 carbon atoms, and optionally a nonconjugated diene;
said random terpolymer rubber (A) being characterized by:
(i) having a molar ratio of ethylene to the α-olefin of 40/60 to 95/5,
(ii) an iodine value of 1 to 50 when the rubber (2) is the diene rubber (B) or nitrile rubber (C) or an iodine value of 5 to 40 when rubber (2) is the random copolymer rubber (D), and
(iii) an intrinsic viscosity (η) measured in decalin at 135° C. which satisfies the inequality:
0.8 dl/g <(η)<5.0 dl/g.

12. An ethylene/α-olefin/nonconjugated polyene terpolymer rubber composition comprising:
(A) a random terpolymer rubber (A) prepared from ethylene, an α-olefin having from 3 to 20 carbon atoms and at least one branched chain polyene compound selected from the group consisting of 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonadiene, 9-methyl-4-ethylidene-1,8-decadiene, and 8,9-dimethyl-4-ethylidene-1,8-decadiene; and
(B) a diene rubber which is natural rubber or isoprene rubber;
said random terpolymer rubber (A) being characterized by:
(i) having a molar ratio of ethylene to the α-olefin of 40/60 to 95/5,
(ii) an iodine value of 1 to 50, and
(iii) an intrinsic viscosity (η) measured in decalin at 135° C. which satisfies the inequality:
0.8 dl/g<(η)<5.0 dl/g.

* * * * *